(12) United States Patent
Swanburg et al.

(10) Patent No.: US 8,433,804 B2
(45) Date of Patent: Apr. 30, 2013

(54) DYNAMIC EVENT SERVER SUBSYSTEM UTILIZING SESSION INITIATION PROTOCOL

(75) Inventors: Scott Allen Swanburg, Duluth, GA (US); Jeffrey Clinton Mikan, Cumming, GA (US); Daryl Gazzard, Alpharetta, GA (US); Matthew Wayne Stafford, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 826 days.

(21) Appl. No.: 11/643,970

(22) Filed: Dec. 22, 2006

(65) Prior Publication Data

US 2007/0168417 A1    Jul. 19, 2007

Related U.S. Application Data

(60) Provisional application No. 60/758,534, filed on Jan. 13, 2006.

(51) Int. Cl.
*G06F 15/16* (2006.01)

(52) U.S. Cl.
USPC .......................................... 709/227; 709/229

(58) Field of Classification Search ............... 709/227, 709/229
See application file for complete search history.

(56) References Cited

U.S. PATENT DOCUMENTS

| | | | |
|---|---|---|---|
| 2003/0187992 A1* | 10/2003 | Steenfeldt et al. | 709/227 |
| 2003/0233457 A1* | 12/2003 | Basilier et al. | 709/227 |
| 2004/0102182 A1* | 5/2004 | Reith et al. | 455/410 |
| 2004/0128310 A1 | 7/2004 | Zmudzinski et al. | |
| 2005/0037746 A1 | 2/2005 | Ramalho et al. | |
| 2006/0123103 A1 | 6/2006 | Shankar et al. | |
| 2006/0253596 A1* | 11/2006 | Barone et al. | 709/229 |
| 2007/0004393 A1* | 1/2007 | Forsberg et al. | 455/420 |
| 2007/0061332 A1* | 3/2007 | Ramer et al. | 707/10 |
| 2007/0156909 A1* | 7/2007 | Osborn et al. | 709/227 |

* cited by examiner

*Primary Examiner* — Dustin Nguyen
*Assistant Examiner* — Joel Mesa
(74) *Attorney, Agent, or Firm* — Hartman & Citrin LLC (57) ABSTRACT

A server subsystem is presented for mobile communication that provides for efficient and logical movement between applications on different servers. Multiple applications may be used simultaneously and interactively using the server system presented herein.

18 Claims, 6 Drawing Sheets

DYNAMIC EVENT SERVER SUBSYSTEM UTILIZING SESSION INITIATION PROTOCOL

This U.S. Utility Patent Application claims priority to U.S. Provisional Patent Application Ser. No. 60/758,534, filed Jan. 13, 2006, the content of which is hereby incorporated by reference in its entirety into this disclosure.

BACKGROUND OF THE INVENTION

1. Field of the Invention

The present invention relates to wireless communication. More particularly, the present invention relates to dynamic event server subsystems utilizing session initiation protocol.

2. Background of the Invention

In order to efficiently provide packet based services to subscribers in a mobile network, an architecture is needed which is data-centric and takes into account the need for individual customization based on the context of the subscriber. Meeting the increasing demand for interactive applications over mobile networks requires a new and different approach to the process of packet data delivery. Mobile networks today cannot meet these requirements because they were conceived and implemented in an environment focused on centralized circuit switched voice services. Mobile subscribers today are interested in a plethora of services, most of which revolve around sophisticated, interactive applications which include voice services (both circuit switched and packet) but are not limited to the same.

Thus, a need exists in the art of wireless communication for creating efficient, intuitive, and easy to operate and implement server subsystems that enable users to have access to one or more applications quickly and simultaneously, as well as toggle between such multiple applications at will with minimal effort.

SUMMARY OF THE INVENTION

Wireless networks today function in a monadic state. They have no uniform integration of service nor do they provide efficient means of collaboration between seemingly disparate applications. A new architecture according to the present invention forms the basis by which applications are distributed in the network, registered with intelligence, perform collaboration between applications, provide an intelligent mobile user experience and manage traffic loading for maximum efficiency of service based on usage.

In one exemplary embodiment, the present invention is a distributed architecture of application servers in a mobile network utilizing Session Initiation Protocol (SIP) for signaling intelligence.

In another exemplary embodiment, the present invention makes use of a proxy server in a SIP enabled mobile network to establish communications with other sub network elements specifically for the purpose of application routing utilizing SIP as the means of intelligent routing.

In yet another exemplary embodiment, the present invention includes a collection of information at the network sub element known as the Dynamic Event Server, which provides intelligence regarding usage patterns, state changes and behaviors from mobile network subscribers.

In another exemplary embodiment, the present invention provides a collection and compilation of uniquely interactive data (data stored from individual usage profiles) at sub elements known as Dynamic Event Servers utilizing SIP to a control server known as the Proxy Registration Authorization Collection (PRAC) Server.

In another exemplary embodiment, the present invention provides a collection and compilation of uniquely interactive data (data stored from individual usage profiles) at sub elements known as Mobile Terminals to a control server known as the Proxy Registration Authorization Collection Server.

In another exemplary embodiment, the present invention provides for a merging and compiling of data utilizing a rules engine at the PRAC server which identifies new state/behavior modes.

In yet another exemplary embodiment, the present invention provides for utilizing behavior/state changes from intelligent network servers, a mechanism allowing customized user profiles and custom services dynamically created and transmitted to mobile subscribers offering a new service or modification to an existing service based on individual context or scenario.

DETAILED DESCRIPTION OF THE INVENTION

The present invention provides a more robust, more intelligent and more versatile server subsystem for use in cellular, wireless devices, Wi-Fi and wireline networks than is conventionally available. Through the use of servers according to the present invention, a user may operate multiple applications, present on a cellular/wireless device, simultaneously and interactively, regardless of what device is used or what network delivers it. Such ability has not been possible in conventional devices because of the conventional configurations that such devices are made available and the lack of ability to access and utilize multiple applications. Furthermore, the interactivity of applications, as shown and presented in the present disclosure, is unavailable to the level and capability presented herein.

The present invention provides a new and unique network architecture for communication utilizing Session Initiation Protocol (SIP) in combination with a distributed set of intelligent applications servers. By distributing the processing of information related to these services, a higher level of network enabled intelligence and efficiency can be achieved. Utilizing SIP over this architecture also provides a user experience which aligns with the market demands for the future of next generation services in a multi application, multi tasking environment.

Further, by breaking down the elements of a distributed applications server network over SIP and providing a new way of allowing the individual applications to interact with other applications, behavior and state changes to the original service offering can be collected, stored and reused to the benefit of the mobile subscriber.

Figure 1:
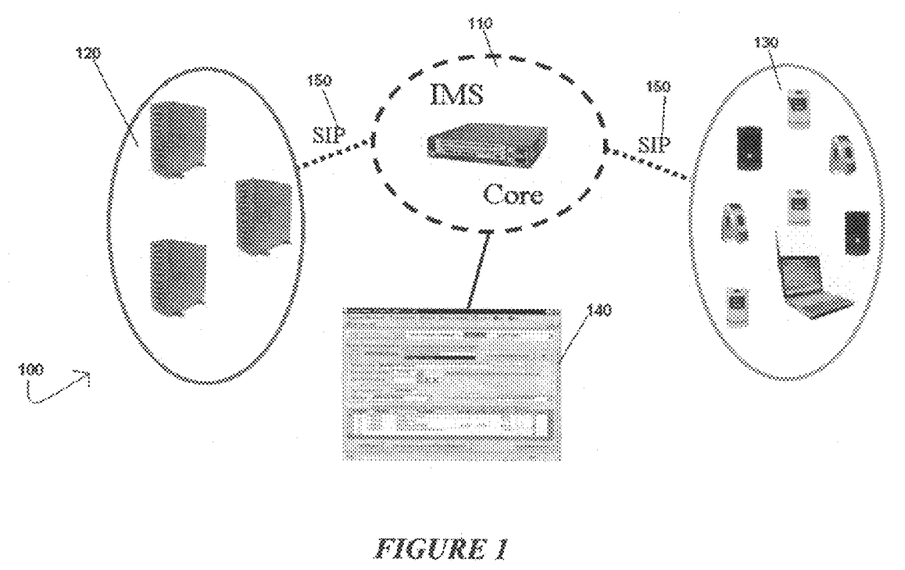
FIG. 1 shows a network architecture according to an exemplary embodiment of the present invention.

An exemplary network architecture 100 for a unified system which allows for application interaction and the intelligent processing of packets over Session Initiation Protocol (SIP) 150 can include four major elements as shown in FIG. 1. These include the Wireless Terminals 130, the IP Multimedia Subsystem (IMS) Core 110, the Dynamic Event Server Subsystem (DESS) 120, and the Back Office (Operations, Administration and Maintenance) 140.

Utilizing these four exemplary elements, a unique user experience can be achieved for mobile network subscribers. The specific unique functionality described herein is associated specifically with the DESS. The DESS contains network enabled applications to be offered up dynamically to mobile terminals with dependency on contextual usage. This new system creates an efficient way in which to launch these applications, authenticate their use, store data associated with the usage of individual applications and the interaction between associated applications at the macro network level. New "state" information collected at the DESS may be transmitted to the terminal (or micro) level of the network.

At least three levels of interaction can take place uniquely in this new mobile networking environment. First, there is linear interaction between the mobile device/client and the applications server. Second, there is interaction between application servers related to the client requests. Third, an interaction takes place between multiple servers at which time the subscriber state change is collected at an aggregation server described in this disclosure as the Proxy Registration Authentication Collection (PRAC) server.

Figure 2:
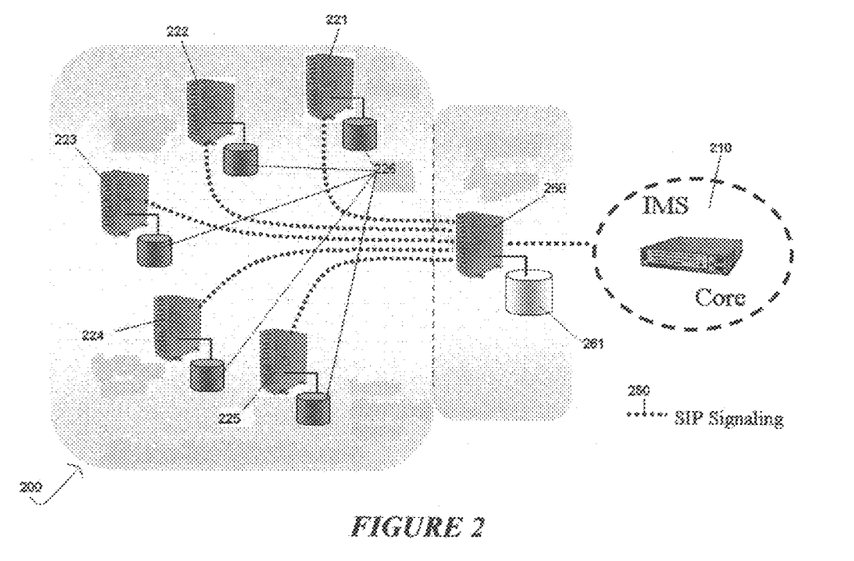
FIG. 2 shows a dynamic event server subsystem according to an exemplary embodiment of the present invention.

An exemplary Dynamic Event Server Subsystem (DESS) 200 according to the present invention includes Dynamic Event Server(s) (DES) 221, 222, 223, 224, 225 and Proxy Registration Authentication Collection (PRAC) Server 260, as shown in FIG. 2. As shown in the figure, the PRAC server 260 is the main interface to the IMS core 210 and the data/signaling aggregator 261 to the DESs 226. In order to provide maximum efficiency in the network, functional delimiters may be used at logical layers of these network elements. SIP signaling 250 is used to facilitate the communication between the various components of this DESS 200.

Examples of delimited functions in the PRAC Server 260 include Proxy, Registration, Authentication and Collection (of integrated state changes), which will be described in more detail below in the discussion of the PRAC server, shown in FIG. 4.

With respect to the collection functional delimiter, in the example shown in FIG. 2, the PRAC server 260 is connected to the following Dynamic Event Servers: the Instant Messaging server, Presence server, Content server, and Location server (as well as others). Within its domain, this PRAC server 260 will receive information regarding the interaction among these functional/application servers (see section below relating to PRAC Server Proxy, Registration, and Authentication). This type of distributed architecture is generally contrary to a typical telephony architecture, which goal is to generally centralize the servers.

DESs can function in at least three discrete areas. First, they are the source of the server side application for a community of subscribers. Second, they collect and act upon data received from individual subscribers (client side applications). Third, they collect interacting information within their own application environment and transmit the newly developed "state/behavior" change back to the Intelligent Information Collection Repository (IICR) 261 at the PRAC server 260.

Figure 3:
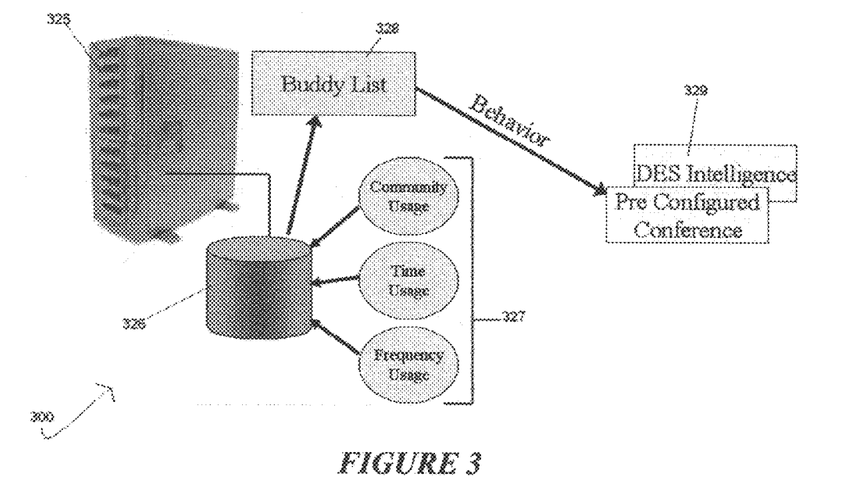
FIG. 3 shows a dynamic event server according to an exemplary embodiment of the present invention.

A typical Dynamic Event Server (DES) 300, according to the present invention, and shown in FIG. 3, includes at least two basic functional elements—to hold host applications and to interact with other servers and PRAC servers. It should be noted that each DES could include one or multiple application servers, depending on the resource of the device.

Server application host—The DES 325 can contain more than a single application. For purposes of this example and for sake of simplicity, the use of a single application is presented per server. In this example, the DES 325 is an Instant Messenger (IM) host. The specific IM network enabled application is hosted at the server and provides basic IM functionality to the subscriber network. As with other network enabled applications, the IM server provides its specific functions related to this application such as logic for the transmission of short messaging. This specific implementation takes advantage of SIP for Instant Messaging and Presence Leveraging Extensions (SIMPLE).

DES level Intelligent Information Collection Repository (IICR) 326—IM clients access this server for their instant messaging over the network. Because this application utilizes SIP as the underlying signaling protocol, additional information is available regarding the usage of the application. An information database collects behavioral usage information such as time of use, interaction between other IM subscribers and volume of usage.

In the particular example shown in FIG. 3, a user is profiled for maximum usage between the hours of 8:00 P.M. and 11:30 P.M. EST. Of the 50 people currently on this subscriber's "buddy list" 328, ten are profiled as most often contacted. Nine out of ten of these most contacted are from the Pacific Time Zone (data collected from server log in). Four of the ten are usually in a multi party IM session at around 10:00 P.M. EST. A rule has been set up in the DES to search for events or other variables 327 with frequency such as this and the subsequent data is collected in the DES IICR 326. As a result of the rule being satisfied, a message is sent to the original subscriber asking "Do you want me to preset an IM session with the following participants—Name 1, Name 2, Name 3, Name 4, Name 5? You can click here \*\*\*.sip.com and all participants will be pre-invited for you." This "intelligent push" 329 creates a unique service offering unavailable in existing networks. In essence, the data that is collected from a user's routine are used so that the user does not have to repeat the series of steps each time to create the same use routine.

The DES 325 should be SIP enabled and provide an interface to the PRAC server for this next level of intelligent interaction. As subscribers meet the conditions of the rule sets within the server application sphere (example described above), this state/behavior condition is transmitted to the PRAC server for the next level of compiled intelligent feedback.

Figure 4:
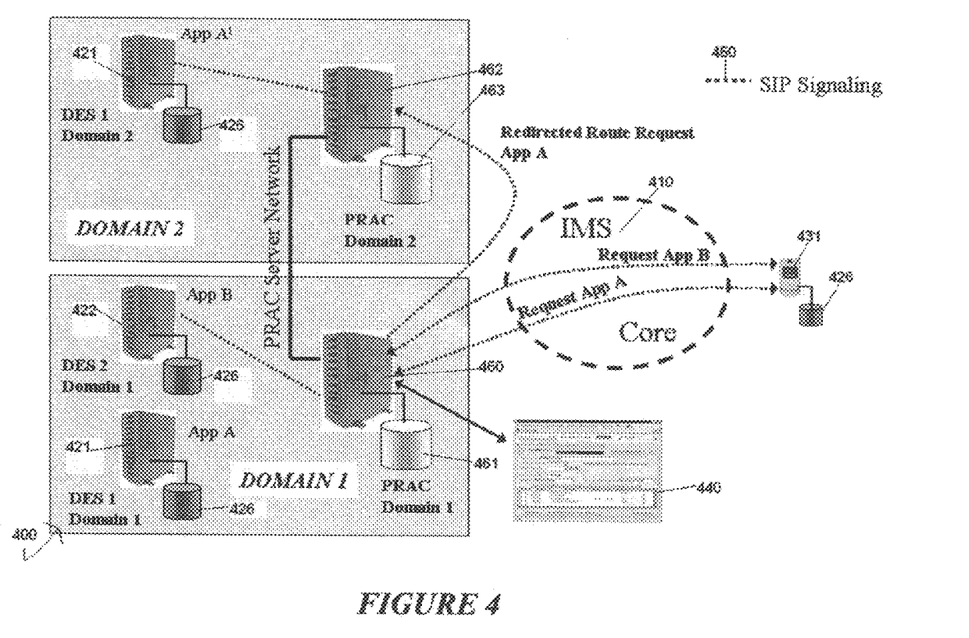
FIG. 4 shows a PRAC server according to an exemplary embodiment of the present invention.

PRAC Server and its Proxy/Registration/Authentication functions are shown in FIG. 4 and will be described in more detail below.

Proxy Function—The PRAC Server 460 engages both the terminal/client 431 and the application server 421, 422 to allow a user with desire in a particular application access to the server that hosts such application. The Forking Proxy function aggregates signals from terminals 431 and directs them to/from the appropriate DES 421, 422. Session Initiation Protocol (SIP) 450 signaling is used to enable this function.

The Registration function—All SIP enabled devices 431 on the network will be registered to the PRAC server 460 for application interaction. The registration schema should conform to IETF SIP standards.

The Redirection function—In the event that the network address is resolved to an alternate routed path, the client may be redirected to the alternate routed PRAC server 462. Redirection of signaling is based on intelligence shared by active PRAC servers 460, 462 in the network (see below for more detailed description). Each PRAC server 460, 462 maintains status of available applications connected to its domain. For instance, when a service request (generated by SIP) is obtained for an application and another PRAC server is at a lower load capacity or has more direct access to that application, the client may be redirected to this more efficient path.

The Authentication function—Network authentication and security functions may be performed (as a part of the IMS Core 410) prior to engaging the PRAC server 460. Application authentication may be done at this layer. Subscribers may be authenticated based on their current status of active registration for applications on the DESS. If the subscriber has an active account (is registered as the owning SIP client for the specified application), he will be authorized for use and subsequent records will be transmitted to the back office billing system for recorded events based on the usage of the application.

Dynamic Event Servers may be distributed throughout the network with consistent duplicate application/data images (mirroring or other approaches) at other physical locations. When a request for application registration and authentication is passed from the IMS core 410 to the PRAC server 460, two initial conditions are invoked. The first condition is for proper authority to register for use of the application (this is accomplished by querying the back office database 440 for active usage billing requirements as shown in FIG. 4). Once authorized, the second condition is application proximity and load dependency. Routing tables are created within each PRAC server 460 to identify load conditions and alternate routes to other PRAC servers. These tables are constantly updated over the network of PRAC servers so that there is a constant feedback of packet routing intelligence. This provides for multiple applications to be serviced over a network of proxied addresses with dependency on most efficient route path for individual applications and for interaction between applications. Once the PRAC server has made the route determination, it will either reroute the request to another PRAC server (from PRAC Domain 1 to PRAC Domain 2) on the network or pass the request onto the designated DES 422 in the current domain for the associated application.

In the particular example shown in FIG. 4, a request has been made to launch Application A and Application B over the network from Wireless Terminal T 431. SIP authentication and registration is accomplished within the IMS Core 410. The next process is to forward the Application Registration/Authentication onto the PRAC server network 460. The first PRAC server 460 is contacted (based on network routing tables from the IMS core to the PRAC server distributed network) and the application requests forwarded. PRAC server 460 in Domain 1 has received the request and checked routing tables for signal distribution. Using the forking proxy capability (again at the PRAC server), the request for application B is forwarded on to the local domain DES 2 identified as 422. Application B becomes active for Wireless Terminal T 431 and transmission takes place through the PRAC server 460 in Domain 1. Alternately, application A has been requested from PRAC server Domain 1 460 and had been rerouted to PRAC server Domain 2 462 (based on current routing table conditions). Using the forking proxy capability, the request for application A is then forwarded on to the local domain (Domain 2) DES 1. Application $A^1$ becomes active (at DES 1, Domain 2) for the wireless terminal and transmission takes place through the PRAC server in Domain 2. IICR 426 assist the DES as described above.

In the example described above with respect to FIG. 4, there are clusters of servers that are in communication with each other. A user may be registered to use the network but is not authorized to use a particular application. In other words, a user may not have paid the required charges to be an authorized user of the application. Various IICR databases 461, 463 provide information sources to the PRAC servers 460, 462, respectively, as described below.

Figure 5:
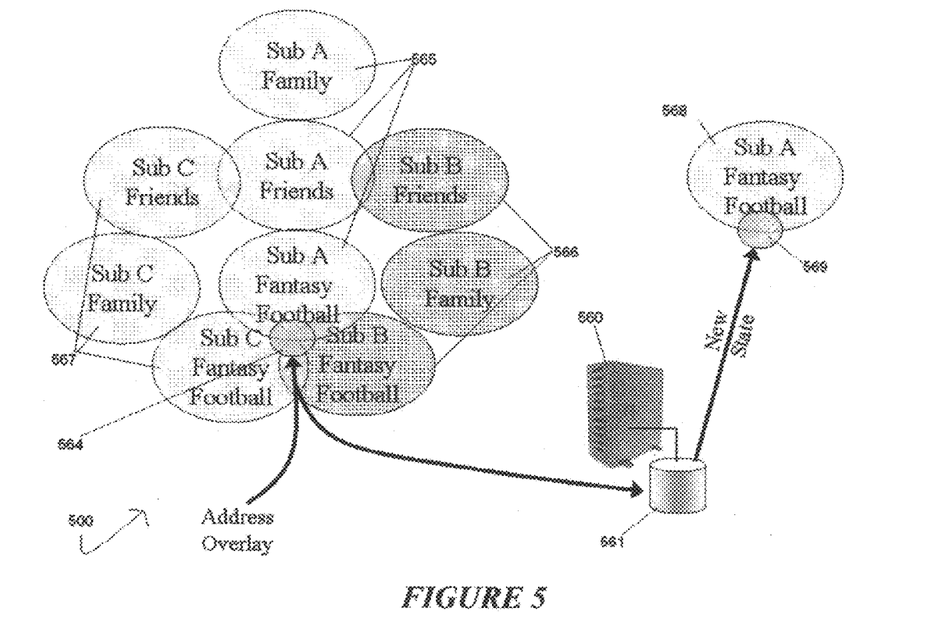
FIG. 5 shows an example of a PRAC server IICR according to an exemplary embodiment of the present invention.

An exemplary scenario 500 of a PRAC Server 560 Intelligent Information Collection Repository (IICR) 561 is shown in FIG. 5. The DES will collect data associated with its own application and the interaction with other applications. After a "state" change is made to the profile of a subscriber registered to the PRAC server 560, the new "state" is recorded and stored in the IICR 561 at the PRAC Server 560.

In the example shown in FIG. 5, there are three subscribers 565, 566, 567 utilizing Instant Messaging address books. Each subscriber 565, 566, 567 has address books labeled Friends, Family and Fantasy Football. Sub A 565 has coincident relationships 564 in his Friends address books with Sub B 566 and Sub C 567. However, Sub A 565 is unaware of the fact that he shares common relationships 564 with people from Sub B 566 and Sub C 567 Fantasy Football address books. A rule is preset in the IICR 561 to find such relationships and send information back to subscribers regarding this condition. In this case, the message "Sub B and Sub C have the following people in their address books that you also have: Person X, Person Y, Person Z. Would you like to add these people to one of your address books with these relationships stored?" Sub A answers affirmatively and a newly defined relationship or community of interest 568 is set up for these people with common interest 569.

Figure 6:
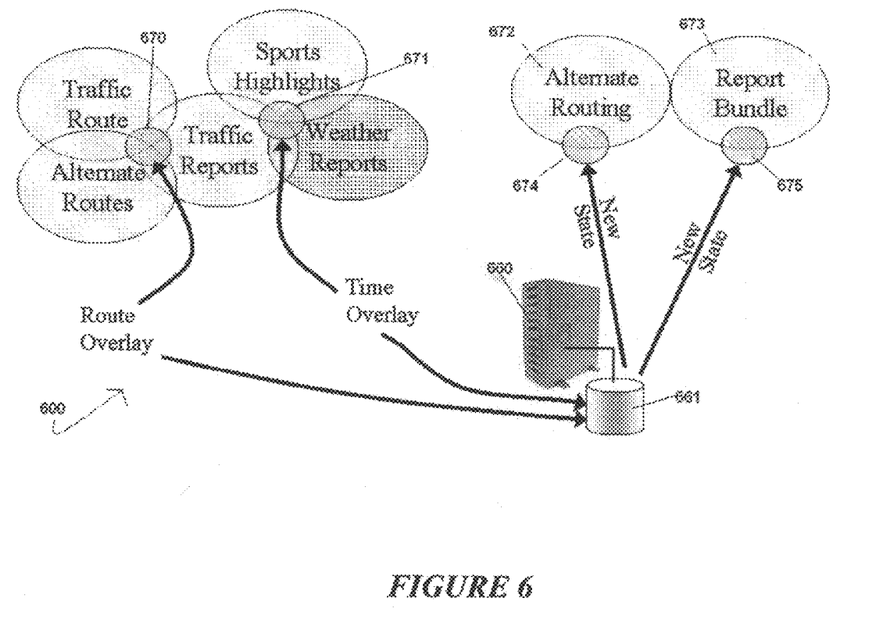
FIG. 6 shows an example of relationship and state changes according to an exemplary embodiment of the present invention.

FIG. 6 shows another example 600 of relationships and state changes, according to the present invention. Every morning between 5:30 and 6:00 A.M. a subscriber views content on his mobile device for weather, sports highlights and the local traffic reports regarding a specific portion of highway. After a week's worth of data collection, the IICR 661 associated with a PRAC 660 recognizes a pattern for this behavior, namely at the same time each day a request of this type is made (a time overlay dependency 671). A query is sent back to the subscriber asking "Would you like me to set up a daily report for you that you can view first thing in the morning which includes sports highlights, weather report and traffic report for your local area?" The subscriber answers yes and a pre-bundle of service 673 is set up to download at 5:15 every morning. An additional benefit realized from this process is network efficiency as the data can be pre-bundled and sent on a preset time 675 schedule to the subscriber with only updates in the live stream.

Additionally, another pattern is recognized from the traffic reporting. A second query from the subscriber (on a daily basis) is associated with a specific traffic route. The subscriber is interested in the route with the least amount of time to destination (association of Traffic Report, Traffic Route and time of day repeated every work day—a route overlay dependency 670). An alternate route database may also be available from a Location server. The IICR 661 associated with a PRAC 660 sends a query to the subscriber with the following "Would you like me to provide you with alternate routes for your destination if the time exceeds "X" value for your commute with the current route?" The subscriber would like this rule set up and the IICR 661 stores the information. On days when the traffic route exceeds the allotted time limit, alternate routes 672 are given to the subscriber. Once again, these routes can be pre-stored and transmitted prior to the necessary time, invoked only when the "time exceeds" condition 674 is met.

Figure 7:
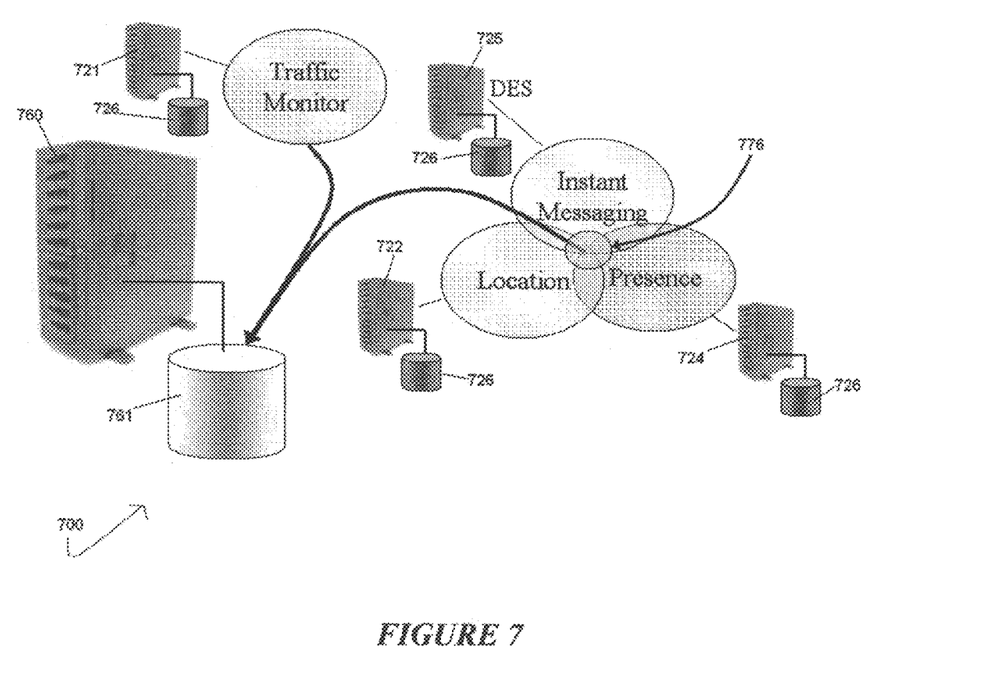
FIG. 7 shows state change and new information collection according to an exemplary embodiment of the present invention.

In the example 700 shown in FIG. 7, three distinctly unique applications, Instant Messaging 725, Presence 724 and Location 722 are used to describe the concept of state change and new information collection at the PRAC server 760. In this example, Subscriber A (S-A) and Subscriber B (S-B) are going to meet at a sporting event and will drive to the event in separate vehicles. S-A is in a traffic jam and wants to know the whereabouts of his friend (S-B). S-A wants to contact S-B via IM (set up and authentication accomplished through DES-IM 725). S-A invokes "presence" to find out if S-B is online (set up and authentication accomplished through DES-Presence 724). S-B sends a message to S-A to tell him he is almost at the game and has avoided the traffic and asks S-A to turn on the Location Based System application they both subscribe to (set up and authentication accomplished through DES-Location 722). S-A can now see the location of S-B from a map overlay on his mobile terminal (a part of the specific application residing on the DES-Location 722). S-B now invokes the local traffic monitor system 721 and allows S-B to track his (alternative) route to the sporting event. New "state" is alternate traffic routing based on location through the IM session utilizing presence. S-B has enabled S-A to latch onto his position and dynamically collect information regarding his current traffic route. This exchange of collaborative information and newly created state/behavior is generated in the PRAC 760/IICR 761 and delivered to the mobile terminal of S-A. This merging 776 of the various applications in various DES 721, 722, 724, 725 to PRAC 760 allows a seamless integration of various applications available to both subscribers. Various databases 726 associated with each DES authenticate each subscriber and allows access to information associated with its corresponding DES 721, 722, 724, 725.

Figure 8:
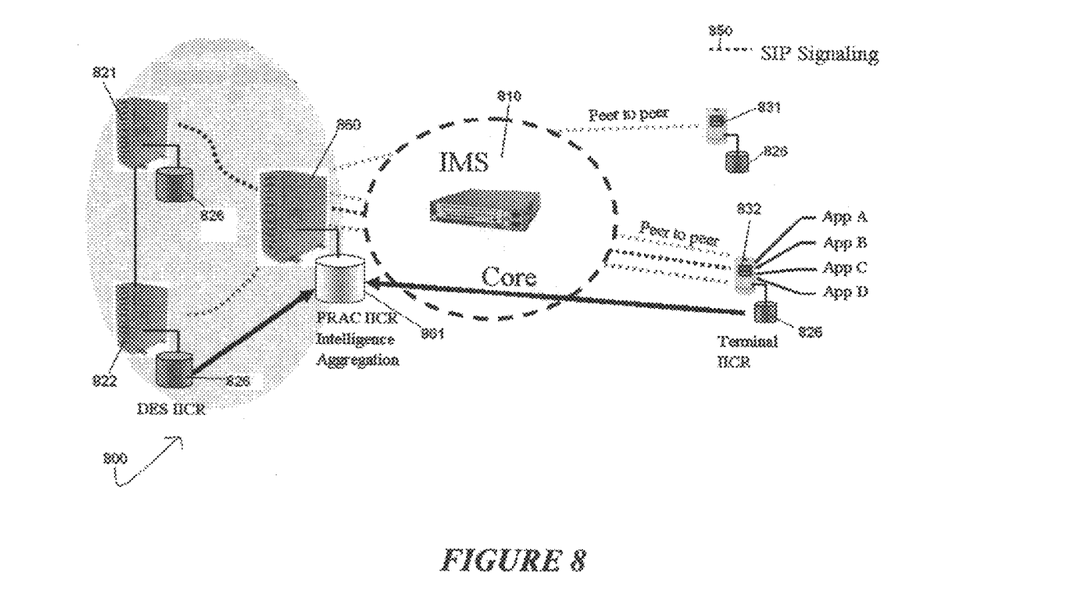
FIG. 8 shows peer to peer application flow according to an exemplary embodiment of the present invention.

In the scenario 800 shown in FIG. 8, a situation is presented that enables peer-to-peer application flow without the need to go through a server. In this example of Terminal Data Flow and IICR Aggregation, each mobile terminal 826 has the capacity to launch multiple applications APP A, APP B, APP C, APP D including stand alone, network application and peer to peer. Stand alone applications do not require custom profiling in the network and are not included in the DESS architecture. Applications dependent on the DESS have already been described in the sections relating to Dynamic Event Server and PRAC Server—Proxy/Registration/Authentication. Peer to peer applications require further definition for use in the DESS.

SIP registration and authentication for peer to peer applications may be handled at the IMS Core 810. Although PRAC server 860 control is not specifically required during the set up and maintenance of a peer to peer session, interaction with other applications (while in a peer to peer session) may result in a state change, requiring data collection at the PRAC server 860. Because the whole user experience is predicated on the transmission of intelligent signaling, in these scenarios, the PRAC server 860 is required. Mobile terminals 831, 832 in this system are configured with their own (micro) IICR 826. Each terminal 831, 832 registers state or behavior changes using this mechanism. When network applications are involved in these state/behavior changes, this data is passed up to the PRAC server 860 and stored in the PRAC server IICR 861. As shown in FIG. 8, subscriber profiling may be accomplished at the PRAC server 860 level and incorporates combined state/behavior changes/input from both the DES IICR 826 associated with DES 821, 822 and the Terminal IICR 826 associated with terminals 831, 832.

Figure 9:
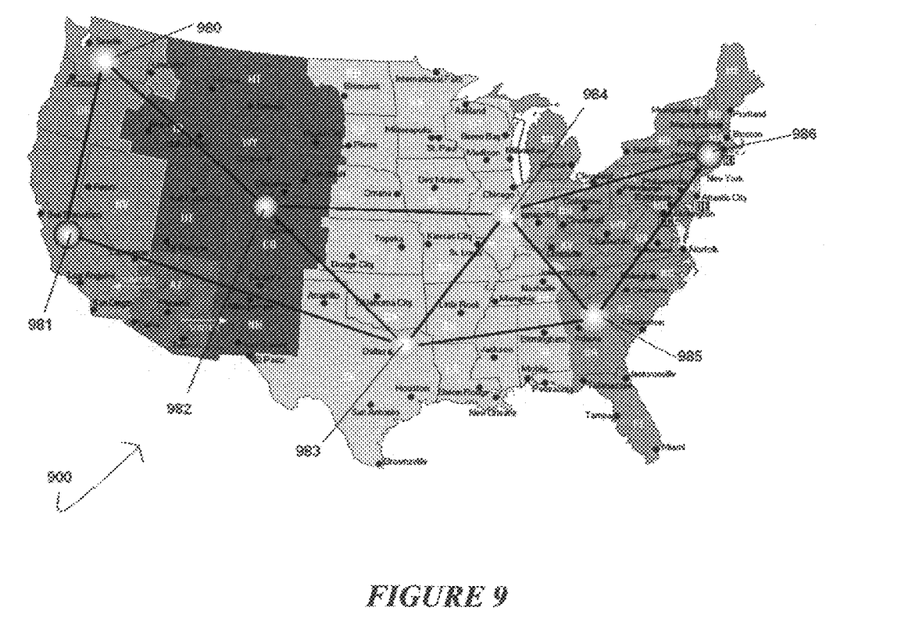
FIG. 9 shows a DESS distributed architecture according to an exemplary embodiment of the present invention.

A DESS Distributed Architecture 900 is shown in FIG. 9. In order for the DESS to be a scalable solution, a distribution of network elements is required. DESSs 980, 981, 982, 983, 984, 985, 986 may be strategically located in the network to provide efficiency of packet routing. As an example of this architecture, FIG. 9 depicts a primary system of DESSs 980, 981, 982, 983, 984, 985, 986 distributed over major metropolitan areas. The primary DESSs 980, 981, 982, 983, 984, 985, 986 are depicted as large dots, secondary DESSs in black with a fail-over redundant routing scheme in place.

As described in the section relating to PRAC Server—Proxy/Registration/Authentication, alternate routing (load and application dependencies) is made possible by this architecture. Network applications may be closer to the subscriber (in terms of routed segments) from one DESS than another. By implementing a distributed network (such as the example in FIG. 9), efficiency of service is greatly improved. This is especially useful where increased interaction is required between the subscriber/client and the specific application residing on the DES. This methodology will aid in limiting latency issues associated with the launch and maintenance of multiple applications running on millions of mobile devices. DESSs may be connected through high speed (fiber optic or other) based networks.

Figure 10:
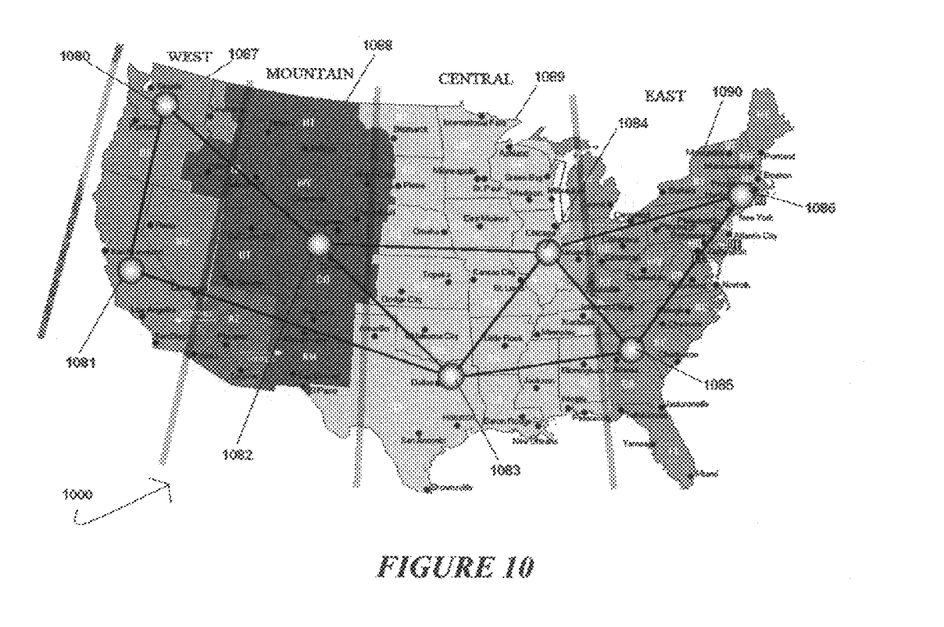
FIG. 10 shows a network quartered off into regional time zones according to an exemplary embodiment of the present invention.

In order to maximize bandwidth, minimize cost and optimize performance, the network providing access for the DESS may take advantage of load balancing based on time of use. In the example 1000 shown in FIG. 10, the network is quartered off into regional time zones 1087, 1088, 1089, 1090 which aid in the network load by time shifting resources. DESS 1080, 1081, 1082, 1083, 1084, 1085, 1086 activation takes place as a function of the moving hours in a day. The East region 1090 for instance is in full interactive mode by 6:00 A.M (Eastern Time) while other time zones 1089, 1088, 1087 are brought up in full capacity as their time zones approach the same relative time, respectively.

Figure 11:
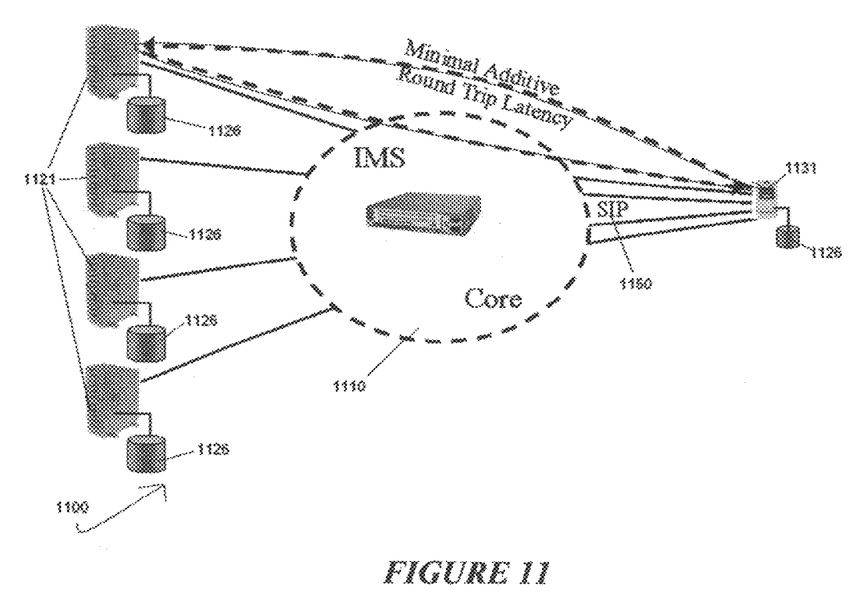
FIG. 11 shows dynamic user transactions according to an exemplary embodiment of the present invention.

As shown in FIG. 11, the user experience is made dynamic through dynamic transactions of the system 1100. The registration of applications to individual DESs 1121 is accomplished by first utilizing the IMS core 1110 for SIP registration and authentication. After which, the initiation of application registrations may be accomplished at the DES and stored in the PRAC server. All applications may be queued up for usage at the terminal 1131 based on this initial registration. Registration need only happen one time as the new application is launched. Subsequent authentication may be based on active use tables located in the PRAC server which is predetermined based on daily input from the back office billing system. Pointers for each "active" application may be utilized at both the DES and the terminal. Once SIP 1150 authentication is achieved in the IMS core 1110, applications will be launched at the terminal 1131 using the most expeditious methods. The method for the launching of these applications may include caching the initial screens or processes in order to enhance the user experience. Most often used applications will also be accounted for in the PRAC server and this information will be available to the DESs 1121 and the terminals 1131 as well for efficiency of service. Various IICR 1126 will assist in this efficient communication as described above.

To limit network load, dynamic user profiles and associated intelligence will only be downloaded to terminals 1131 on a periodic basis. This may either be in a non-peak usage period or after some state of dormancy is detected from the terminal. Total round trip latency from the terminal to the DESS 1121 and back (see FIG. 11) should be held to a minimum. Any input from the subscriber requiring interaction with the DESS 1121 should create a positive user experience related to wait time for switching from any one application to another. It is recommended that this wait time be less than 100 milliseconds (additional to any physical layer network latency).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A server subsystem on a mobile communication network, the server subsystem comprising:
a primary server that receives a request from a wireless terminal for a particular application over the mobile communication network, the particular application including any combination of an instant messaging application, a presence application, and a location application;
an information database in communication with the primary server for collecting behavioral usage information for the wireless terminal, the information database containing information relating to the historical preferences of a particular user of the wireless terminal; and
logic on the primary server to for enabling the primary server to perform operations including:
registering the request for the particular application,
authenticating the request by querying a back-office database for an active usage billing requirement,
storing the authenticated request in an active use table on a database on the primary server, and
contacting a secondary server that hosts the particular application to enable the wireless terminal to have access to the application, the secondary server being in communication with the primary server through session initiation protocol (SIP) signaling over the mobile communication network, the secondary server further being located at a particular physical location in the mobile communication network,
wherein a subsequent authentication for the particular application is based on the authenticated request stored in the active use table,
wherein a collection of events determined by the behavioral usage information and an associated rules engine produce a state change that is dynamically acted upon on behalf of the particular user of the wireless terminal, upon transmitting a query including the state change to the wireless terminal and receiving a confirmation from the wireless terminal, the collection of events including receiving a message transmitted from a second wireless terminal, the message including an indicator of a location of the second wireless terminal,
wherein the state change includes providing an alternative route to to the wireless terminal based upon the location of the second wireless terminal,
wherein the active use table is regularly updated with billing information from the back-office database,
wherein the primary server is in communication with a plurality of primary servers, and
wherein the logic on the primary server creates a routing table to identify load conditions and alternate routes to each of the plurality of primary servers.

2. The server subsystem of claim 1, wherein each primary server is in communication with a plurality of secondary servers through SIP signaling.

3. The server subsystem of claim 2, wherein each set of connected primary and secondary servers are located at a unique domain corresponding to the particular physical location.

4. The server subsystem of claim 3, wherein when the secondary server of the unique domain has heavy traffic due to a hosted application therein, its corresponding primary server redirects a new application request to a second secondary server at a second unique domain at a second physical location, the second secondary server having the same application, through SIP signaling via one of the plurality of primary servers.

5. The server subsystem of claim 1, wherein the primary server is a Proxy Registration Authorization Collection (PRAC) server.

6. The server subsystem of claim 1, wherein the secondary server is a dynamic event server.

7. The server subsystem of claim 1, wherein each secondary server includes a secondary information database that collects behavioral usage information.

8. The server subsystem of claim 1, wherein a presentation of a state change to the mobile subscriber results in a new service offering comprising combinational services derived from intelligence provided by the mobile communication network.

9. A system for mobile communication, the system comprising:
a primary Proxy Registration Authorization Collection (PRAC) server that receives a request from a wireless terminal for a particular application over a mobile communication network, the particular application including any combination of an instant messaging application, a presence application, and a location application;
an information database in communication with the primary PRAC server for collecting behavioral usage information for the wireless terminal, the information database containing information relating to the historical preferences of a particular user of the wireless terminal; and logic on the primary PRAC server for enabling the primary PRAC server to perform operations including:
registering the request for the particular application,
authenticating the request by querying a back-office database for an active usage billing requirement,
storing the authenticated request in an active use table on a database on the primary PRAC server and
contacting a secondary Dynamic Event Server (DES) server that hosts the particular application to enable the wireless terminal to have access to the particular application, the secondary DES server being in communication with the primary PRAC server through session initiation protocol (SIP) signaling over the mobile communication network, the secondary DES server further being located at a particular physical location in the mobile communication network;

wherein a subsequent authentication for the particular application is based on the authenticated request stored in the active use table, wherein a collection of events determined by the behavioral usage information and an associated rules engine produce a state change that is dynamically acted upon on behalf of the particular user of the wireless terminal, upon transmitting a query including the state change to the wireless terminal and receiving a confirmation from the wireless terminal, the collection of events including receiving a message transmitted from a second wireless terminal, the message including an indicator of a location of the second wireless terminal, wherein the state change includes providing an alternative route to the wireless terminal based upon the location of the second wireless terminal, wherein the active use table is regularly updated with billing information from the back-office database, wherein the primary PRAC server is in communication with a plurality of primary PRAC servers, and wherein the logic on the primary PRAC server creates a routing table to identify load conditions and alternate routes to each of the plurality of primary PRAC servers.

10. The system of claim 9, wherein each primary PRAC server is in communication with a plurality of secondary DES servers through SIP signaling.

11. The system of claim 10, wherein each set of connected primary PRAC and secondary DES servers are located at a unique domain corresponding to the particular physical location.

12. The system of claim 11, wherein when the secondary DES server of the unique domain has heavy traffic due to a hosted application therein, its corresponding primary PRAC server redirects a new application request to a second secondary DES server at a second unique domain at a second physical location, the second secondary DES server having the same application through SIP signaling via one of the plurality of primary servers.

13. The system of claim 9, wherein the secondary DES server has an associated secondary information database that collects behavioral usage information.

14. The system of claim 13, wherein the information database on each primary PRAC and secondary DES server includes an intelligent information collection repository.

15. The system of claim 14, wherein the intelligent information collection repository contains the information relating to the historical preferences of a particular user.

16. A method of mobile communication, the method comprising:
receiving a request for an application from a terminal at a first primary server, the application including any combination of an instant messaging application, a presence application, and a location application, the location application determining a first location of the terminal;
registering the request for the application by querying a back-office database for an active usage billing requirement;
storing the request in an active use table on a database on the primary server;
determining a secondary server source for the application from a plurality of secondary servers, each secondary server in communication with the primary server through session initiation protocol (SIP) signaling;
contacting the secondary server where such application is hosted to enable the terminal to have access to the application;
processing a subsequent authentication for the application by referring to the request stored in the active use table, wherein the active use table is regularly updated with billing information from the back-office database;
communicating with a plurality of primary servers;
creating a routing table within the first primary server, the routing table identifying load conditions and alternate routes to each of the plurality of primary servers;
producing a state change on behalf of a subscriber operating the terminal based on behavioral usage information for the subscriber, the behavioral usage information being stored on an information database in communication with the first primary server and including at least receiving a message from a second terminal, the message including a second location of the second terminal;
querying the terminal with the produced state change, the produced state change including providing an alternative route to the terminal based on the second location of the second terminal;
receiving a confirmation from the terminal; and
initiating the stage change for the subscriber in response to the confirmation.

17. The method of claim 16, wherein the primary server is a Proxy Registration Authorization Collection (PRAC) server.

18. The method of claim 16, wherein the secondary server is a Dynamic Event Server (DES).

* * * * *